(12) United States Patent
Tomita et al.

(10) Patent No.: US 6,945,060 B2
(45) Date of Patent: Sep. 20, 2005

(54) VEHICLE AIR CONDITIONING SYSTEM

(75) Inventors: Hiroyuki Tomita, Nagoya (JP); Shigeki Harada, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/739,987

(22) Filed: Dec. 18, 2003

(65) Prior Publication Data

US 2004/0129007 A1 Jul. 8, 2004

(30) Foreign Application Priority Data

Dec. 18, 2002 (JP) ........................................ 2002-366859

(51) Int. Cl.⁷ .......................... G05D 23/32; F25D 29/00; F25B 19/00; B60H 1/00
(52) U.S. Cl. .............................. 62/157; 62/161; 62/231; 62/244; 165/203; 236/1 B
(58) Field of Search ......................... 62/157, 161, 231, 62/244; 165/202, 203, 205; 236/51, 1 B

(56) References Cited

U.S. PATENT DOCUMENTS

| | | | |
|---|---|---|---|
| 6,488,213 B2 * | 12/2002 | Ohga et al. | 236/49.3 |
| 6,644,558 B2 * | 11/2003 | Ohga et al. | 236/49.3 |
| 6,669,101 B2 * | 12/2003 | Ichishi et al. | 236/49.3 |
| 6,827,284 B2 * | 12/2004 | Ichishi et al. | 236/49.3 |
| 2004/0194945 A1 * | 10/2004 | Durach et al. | 165/202 |

FOREIGN PATENT DOCUMENTS

| | | | | |
|---|---|---|---|---|
| JP | 04-131641 A | * | 5/1992 | F24F/11/02 |
| JP | 6-122316 | | 6/1994 | |

* cited by examiner

*Primary Examiner*—Marc Norman
(74) *Attorney, Agent, or Firm*—Harness, Dickey & Pierce, PLC

(57) ABSTRACT

A vehicle air conditioning system is capable of learning preferences for a plurality of passengers, altering control characteristics of air conditioning means based on the results of learning, and automatically controlling the system. The system is capable of adjusting a temperature separately and independently for the left and right sides of a passenger compartment, and stores a temperature setting map of preferences of respective passengers for the Dr side and Pa side. Temperature set points are used for calculating blowing temperatures and determining opening degrees of air mix dampers. If a set point temperature is changed by a manual setting, the temperature-setting map is altered and restored by learning such change, and thus the temperature-setting map can be updated to reflect preferences of each passenger for each of the Dr side and Pa side.

13 Claims, 10 Drawing Sheets

VEHICLE AIR CONDITIONING SYSTEM

CROSS REFERENCE TO RELATED APPLICATIONS

This application is based upon, claims the benefit of priority of, and incorporates by reference Japanese Patent Application No. 2002-366859 filed Dec. 18, 2002.

BACKGROUND OF THE INVENTION

1. Field of the Invention

The present invention relates to a vehicle air conditioning system capable of automatic control to reflect the preferences of passengers.

2. Description of the Related Art

Vehicle air conditioning systems are conventionally known that are designed to learn the preferences of passengers, store the results of learning, and use the stored data as control characteristics for future air conditioning control (see, for example, Japanese Patent Laid-Open Publication No. Hei 6-122316).

However, the air-conditioner as disclosed in the above-mentioned patent publication is only capable of learning preferences of a particular passenger such as a driver. Since different passengers have different preferences for air conditioning states, it is desirable that an air conditioning system be capable of learning, even when multiple passengers are on board, respective preferences of the passengers and be capable of performing automatic control by changing control characteristics of air conditioning means based on the results of its learning.

SUMMARY OF THE INVENTION

An object of the present invention is to provide a vehicle air conditioning system that is capable of learning, even when a plurality of passengers are on board, respective preferences of the passengers for an air conditioning state and that is capable of performing automatic control by changing control characteristics of the air conditioning means based on the results of learning.

A vehicle air conditioning system according to a first aspect of the invention has a storing means for storing control characteristics of air conditioning means for each passenger, an automatic control means for automatically controlling a control state of the air conditioning means based on the control characteristics of the air conditioning means for each passenger stored by the storing means. Additionally, the system has a manual setting means capable of manually setting the control state of the air conditioning means for each passenger, a passenger identifying means for identifying a passenger, and a characteristics altering means for learning selection of a set state of the manual setting means. Finally, the system has the capability of altering the control characteristics of the air conditioning means for each passenger stored in the storing means based on the results of learning, and subsequently storing the altered control characteristics.

According to this aspect of the invention, the air conditioning system is capable of storing control characteristics reflecting respective preferences of the passengers and air conditioning a passenger compartment in accordance with the respective preferences of the passengers.

In a second aspect of the invention, the passenger identifying means is capable of identifying a seat position taken by the identified passenger, and the storing means is capable of storing control characteristics of the air conditioning means for each seat position taken by the identified passenger. The characteristics altering means is capable of altering control characteristics of the air conditioning means for each seat position taken by the identified passenger and causing the altered control characteristics to be stored.

According to this aspect, in addition to the advantages of the first aspect, control characteristics reflecting respective preferences of the passengers at the corresponding seat positions can be stored and a vehicle compartment can be air-conditioned, reflecting such a preference of each passenger at each seat position.

In a third aspect of the invention, the passenger identifying means is a personal key. By using the personal key, similar advantages to those of the first or second aspect can be obtained. In a fourth aspect of the invention, the passenger identifying means is personal data, whereby similar advantages to those of the first or second aspect can be obtained. In a fifth aspect of the present invention, the passenger identifying means is a mobile phone, whereby similar advantages to those of the first or second aspect can be obtained.

In a sixth aspect of the present invention, the air conditioning means is an inside/outside air switching means for switching between an outside air inlet mode for introducing outside air and an inside air circulation mode for circulating inside air. According to this aspect, control characteristics reflecting respective preferences of the passengers at the corresponding seat positions can be stored and it is possible to switch between the inside air circulation mode and the outside air inlet mode according to such preferences of each passenger at each seat position.

In a seventh aspect of the present invention, the air conditioning means is an airflow rate adjusting means for adjusting the rate of airflow into a duct. According to this aspect, control characteristics of the airflow rate adjusting means, reflecting respective preferences of the passengers at the corresponding seat positions, can be stored and the airflow rate can be adjusted according to such a preference of each passenger at each seat position.

In an eighth aspect of the present invention, the air conditioning means is a cooling/dehumidifying means for cooling and dehumidifying outside air or inside air introduced into a duct. According to this aspect, control characteristics of the cooling/dehumidifying means reflecting respective preferences of the passengers at the corresponding seat positions can be stored and air can be cooled and dehumidified according to such preferences of each passenger at each seat position.

In a ninth aspect of the present invention, the air conditioning means is a temperature adjusting means for adjusting a temperature by heating outside air or inside air introduced into the duct. According to this aspect, control characteristics of the temperature adjusting means reflecting respective preferences of the passengers at the corresponding seat positions can be stored and the temperature can be adjusted in accordance with such a preference of each passenger at each seat position.

In a tenth aspect of the present invention, the air conditioning means is a blowing mode switching means for selecting a blowing mode of outside air or inside air introduced into the duct. According to this aspect, control characteristics of the blowing switching means reflecting respective preferences of the passengers at the corresponding seat positions can be stored, and a blowing mode can be selected according to such preferences of each passenger at each seat position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.
(Configuration of First Embodiment)

Figure 1:
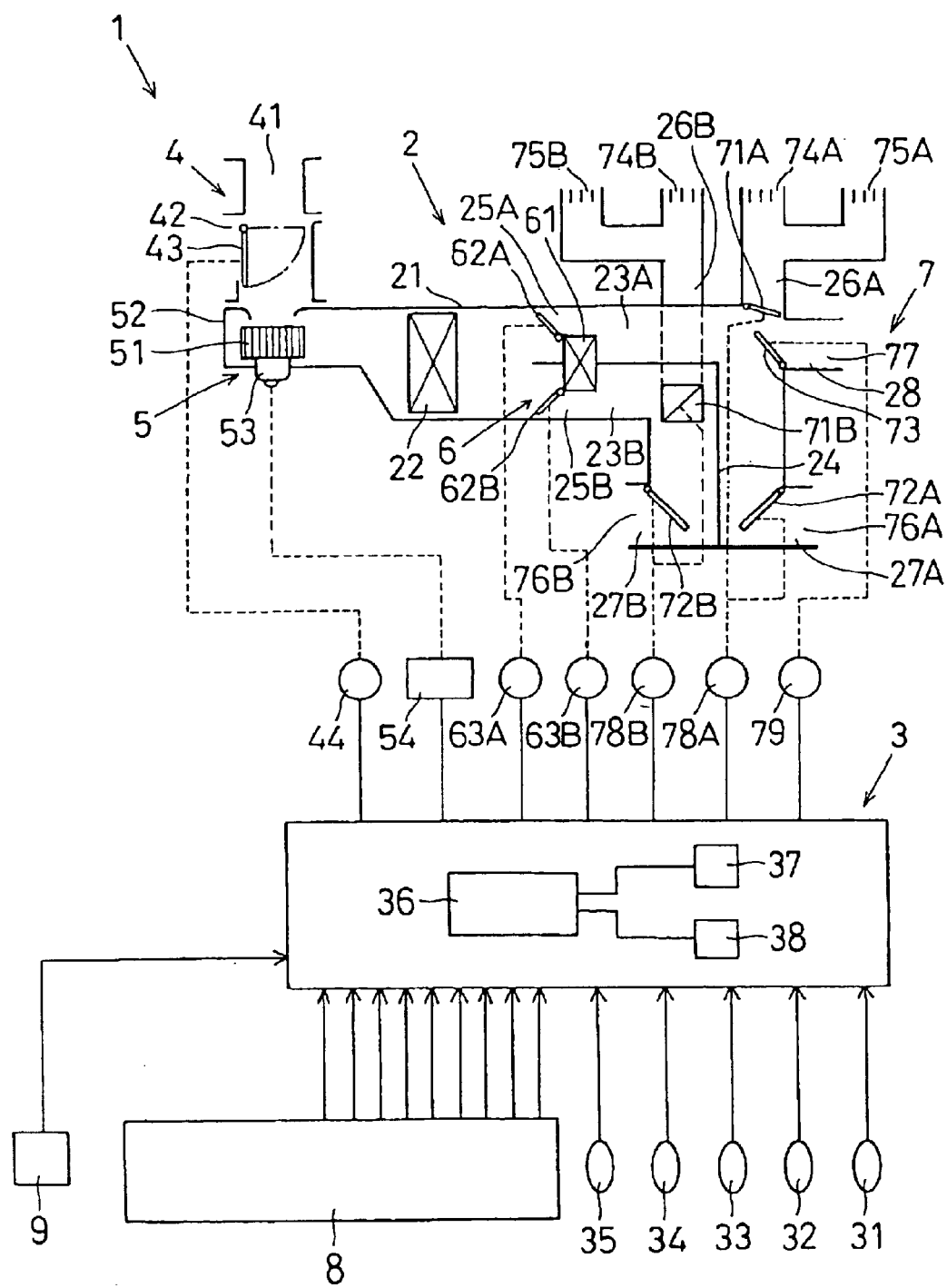
FIG. 1 is a diagram of a general configuration of a vehicle air conditioning system according to a first embodiment of the present invention.
Figure 2:
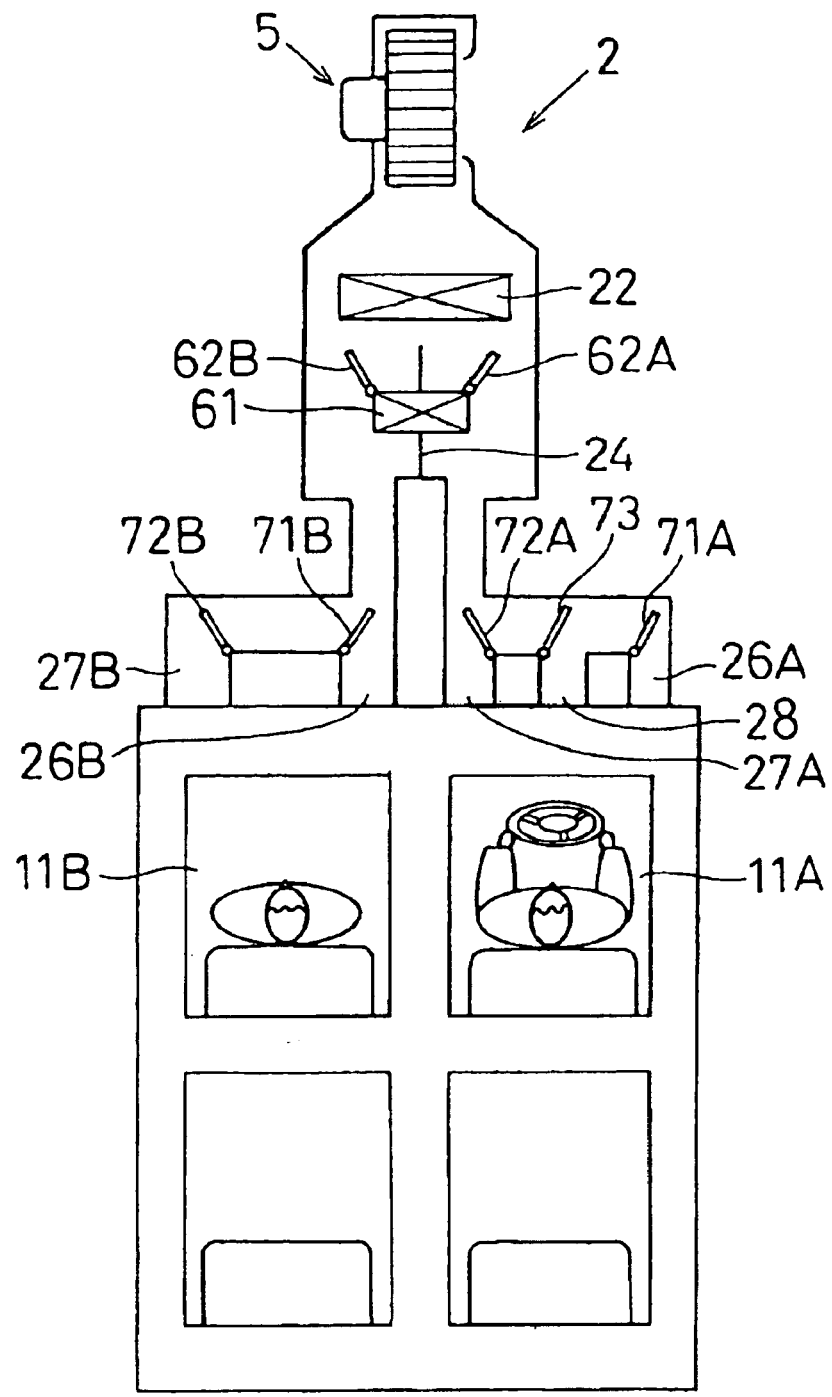
FIG. 2 is a diagram of the vehicle air conditioning system of the first embodiment and seat positions in a passenger compartment.

Configuration of a first embodiment of the present invention will be described below with reference to FIGS. 1 through 3. In a vehicle air conditioning system 1 according to the first embodiment, air conditioning means (actuators) of an air conditioning unit 2 for air conditioning the passenger compartment of a vehicle, such as an automobile equipped with an engine, are controlled by an air conditioning electric control unit (hereinafter, called "ECU") 3. The air conditioning unit 2 allows independent control of temperature of an air conditioning zone 11A involving a right side seat of the vehicle (i.e. driver's seat side; hereinafter to be called "Dr side") and of an air conditioning zone 11B involving a left side seat of the vehicle (i.e. passenger seat side; hereinafter to be called "Dr side"). The ECU 3, having a learning function, is capable of identifying a passenger and the passenger's seat position (Dr side or Pa side), learning a temperature setting of the passenger at the corresponding seat position, and automatically controlling the control state of the air conditioning means with respect to temperature based on the result of learning.

The air conditioning unit 2 is made up of a duct 21 constituting an air passageway for delivering air to the passenger compartment. Inside/outside air switching means 4 is provided in an upstream part of the duct 21. The inside/outside air switching means 4 has an inside air inlet port 41 communicating with the inside of the passenger compartment for introducing the air within the compartment (inside air), an outside air inlet port 42 communicating with the outside of the compartment for introducing the air outside the compartment (outside air), and an inside/outside air switch-over damper 43 for switching the air introduced into the duct 21 between inside air and outside air. An inside/outside air switching actuator 44 such as a servomotor for driving the inside/outside air switchover damper 43 is controlled by the ECU 3, which will be described later.

A blower 5 constituting an airflow rate adjusting means is connected downstream of the inside/outside air switching means 4. The blower 5 comprises a fan 51, a fan case 52 for accommodating the fan 51, and a blower motor 53 for rotationally driving the fan 51, according to an applied voltage, to allow the fan 51 to send outside air or inside air via the duct 21 into the compartment. The blower motor 53 changes its speed of rotation in accordance with a voltage applied to a blower driving circuit 54 (blower voltage) to enable the adjustment of airflow rate of inside or outside air. The blower voltage is controlled by the ECU 3 described later.

An evaporator (cooling heat exchanger) 22 serving as an air cooling/dehumidifying means is provided downstream of the blower 5 and in the center of the duct 21 so as to extend across the duct 21. The evaporator 22 is a refrigerant evaporator in a refrigerating cycle (not shown), and cools and dehumidifies air sent by the blower 5 in response to operation of the refrigerating cycle. The refrigerating cycle is of a known type and is made up of, in addition to the evaporator 22, a refrigerant compressor, a refrigerant condenser, a refrigerant expansion valve, and so on, none of which are shown in the drawings. The refrigerating cycle is activated by an electromagnetic clutch (not shown) of the compressor that is energized to transmit engine torque to the compressor.

The area downstream of the evaporator 22 is divided by a partition 24 into a first air passageway 23A for blowing air to the Dr side air conditioning zone 11A and a second air passageway 23B for blowing air to the Pa side air conditioning zone 11B.

A temperature adjusting means 6 is provided upstream of the partition 24 for adjusting the air temperature by heating air cooled and dehumidified by the evaporator 22. The temperature adjusting means 6 is provided with a heater core (heating heat exchanger) 61 for heating air passing through the first and second air passageways 23A, 23B by using engine cooling water as a heat source, and the heater core 61 is arranged to penetrate through the partition 24.

A first bypass passageway 25A bypassing the heater core 61 is provided upstream of the first air passageway 23A. A ratio between an air quantity passing through the heater core 61 and an air quantity passing through the first bypass passageway 25A is adjusted by a first air mix damper 62A. The first air mix damper 62A is a component constituting the temperature adjusting means 6 and adjusts the temperature of air blown from the first air passageway 23A towards the Dr side air conditioning zone 11A by varying the ratio between the air quantity passing through the heater core 61 and the air quantity passing through the first bypass passageway 25A. The first air mix damper 62A is driven by a first temperature controlling actuator 63A (e.g. a servo motor) that is energized and controlled by the ECU 3, which will be described later.

Also located upstream of the second air passageway 23B, there is a second bypass passageway 25B bypassing the heater core 61. A ratio between an air quantity passing through the heater core 61 and an air quantity passing through the second bypass passageway 25B is adjusted by a second air mix damper 62B. The second air mix damper 62B is also a component constituting the temperature adjusting means 6 and adjusts the temperature of air blown from the second air passageway 25B towards the Pa side air conditioning zone 11B by varying the ratio between the air quantity passing through the heater core 61 and the air quantity passing through the second bypass passageway 25B.

The second air mix damper 62B is driven by a second temperature controlling actuator 63B (e.g. a servo motor) that is energized and controlled by the ECU 3, which will be described later. Downstream of the first air passageway 23A, there are provided air passageways for guiding air that has passed through the first air passageway 23A to respective blowing openings for blowing air to the Dr side air conditioning zone 11A. The air passageways consist of a first face blowing air passageway 26A for blowing primarily cool air from the front of the compartment towards a driver's upper body, a first foot blowing air passageway 27A for blowing primarily warm air towards a driver's feet, and a defroster air passageway 28 for blowing primarily warm air towards a variety of windows.

The first face blowing air passageway 26A, first foot blowing air passageway 27A, and defroster air passageway 28 are respectively provided with a first face-mode damper 71A, first foot-mode damper 72A and defroster damper 73A as a blowing mode switching means 7 for selecting a blowing mode in accordance with a target blowing air temperature to be described later.

At the downstream end of the first face blowing air passageway 26A, there are provided a first center face blowing opening 74A for blowing primarily cool air from a frontal center part of the passenger compartment towards a driver's upper body via the first face-mode damper 71A, and a first side face blowing opening 75A for blowing primarily cool air from a frontal side part of the passenger compartment towards a driver s upper body also via the first face-mode damper 71A. These blowing openings also constitute components of the blowing mode switching means 7. Similarly, at the downstream end of the first foot blowing air passageway 27A, there is provided a first foot blowing air passageway 76A for blowing primarily warm air towards a driver's feet via the first foot-mode damper 72A. At the downstream end of the defroster air passageway 28, there is provided a defroster blowing opening 77 for blowing primarily warm air towards the windows via the defroster damper 73. These blowing openings also constitute components of the blowing mode switching means 7.

The first face-mode damper 71A and first foot-mode damper 72A are driven by a first mode switching actuator 78A such as a servo motor, and the defroster damper 73 is driven by a defroster actuator 79 such as a servo motor. These actuators are energized and controlled by the ECU 3, which will be described later. Further, a louver is provided in the first center face blowing opening 74A and the first side face blowing opening 75A so that the airflow rate can be manually adjusted in accordance with a driver's preference.

Air passageways are provided downstream of the second air passageway 23B for guiding air that has passed through the second air passageway 23B to respective blowing openings for blowing air to the Pa side air conditioning zone 11B. These air passageways consist of a second face blowing air passageway 26B for blowing primarily cool air towards a passenger's upper body from the front of the passenger compartment, and a second foot blowing air passageway 27B for blowing primarily warm air towards a passenger's feet.

The second face blowing air passageway 26B and the second foot blowing air passageway 27B are provided with a second face-mode damper 71B and a second foot-mode damper 72B, respectively, as the blowing mode switching means 7 for selecting a blowing mode in accordance with a target blowing temperature, which will be described later.

At the downstream end of the second face blowing air passageway 26B, there are provided a first center face blowing opening 74B for blowing primarily cool air from a frontal center part of the passenger compartment towards a passenger's upper body via the second face-mode damper 71B, and a second side face blowing opening 75B for blowing primarily cool air from a frontal side part of the compartment towards a passenger's upper body. These blowing openings constitute components of the blowing mode switching means 7. Similarly, at the downstream end of the second foot blowing air passageway 27B, there is provided a second foot blowing air passageway 76B for blowing primarily warm air towards a passenger's feet via the second foot-mode damper 72B and constitutes a component of the blowing mode switching means 7.

The second face-mode damper 71B and the second foot-mode damper 72B are driven by a second mode switching actuator 78B controlled by the ECU 3, which will be described later. Further, a louver is provided in the second center face blowing opening 74B and second side face blowing opening 75B so that the airflow rate can be manually adjusted in accordance with a passenger's preference.

The ECU 3 activates electronic functional parts for operating the vehicle air conditioning system 1 and automatically controls these air conditioning means by means of various input signals and a pre-input program. These functional parts, or air conditioning means, include the inside/outside air switching actuator 44 driving the inside/outside air switch-over damper 43, the blower motor 53 rotationally driving the fan 51 of the blower 5 according to a blower voltage applied through the blower driving circuit 54, the first temperature controlling actuator 63A driving the first air mix damper 62A, the second temperature controlling actuator 63B for driving the second air mix damper 62B, the first mode switching actuator 78A driving the first face-mode damper 71A and first foot-mode damper 72B, the second mode switching actuator 78B driving the second face-mode damper 71B and second foot-mode damper 72B, and so on.

The ECU 3 receives signals from an operation panel 8 for displaying and manually setting the control state of the various air conditioning means. The means include: a CCD camera 9 serving as a passenger identifying means for detecting a passenger and his/her seat position; an inside air temperature sensor 31 for detecting a temperature of air inside the compartment (hereinafter, referred to as "inside air temperature") Tr; an outside air temperature sensor 32 for detecting temperature of air outside the compartment (hereinafter, referred to as "outside air temperature") Tam; a solar sensor 33 for detecting an intensity of solar radiation Ts that the compartment receives; a post-evaporation temperature sensor 34 for detecting temperature of air immediately after passing through the evaporator 22 (hereinafter, to be referred to as "post-evaporation temperature") Te; a water temperature sensor 35 for detecting the temperature of air that has passed through the heater core 61 and of cooling water supplied to the heater core 61 (hereinafter, to be referred to as "cooling water temperature") Tw; and so on.

The inside air temperature sensor 31 may be provided only on the Dr side so that the inside air temperature on the Pa side is determined based on a difference between a first set point temperature Tset1 on the Dr side and a second set point temperature Tset2 on the Pa side, which will be described later. Alternatively, the inside air temperature sensor 31 may be provided on both the driver and Pa sides for independently detecting the temperature on both sides.

Figure 3:
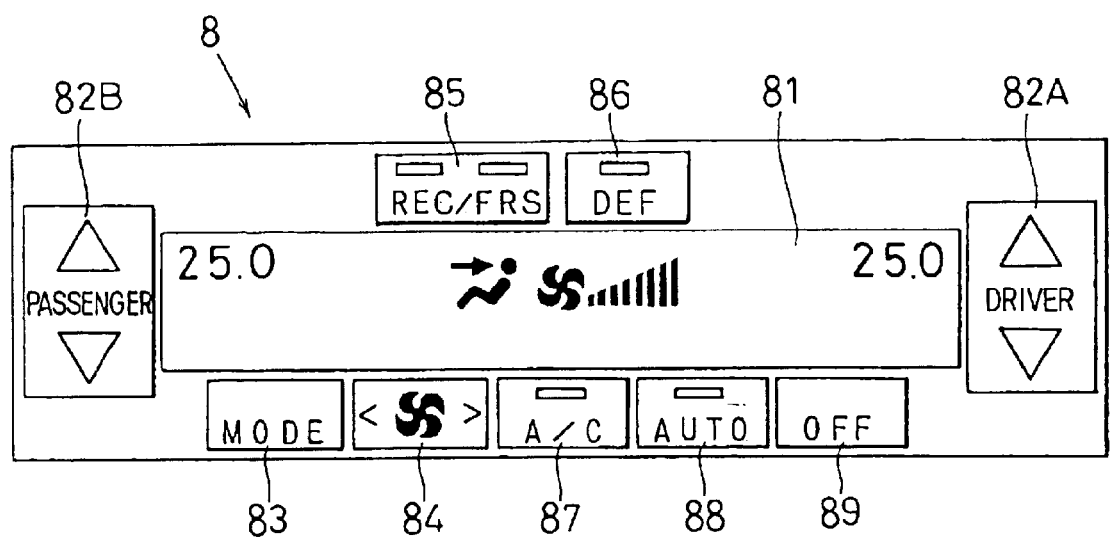
FIG. 3 is a plan view of an operation panel.

As shown in FIG. 3, the operation panel 8 has a liquid crystal display 81 for displaying the control states of the various air conditioning means, and a manual setting means (selector switches) for manually setting the displayed control states of the air conditioning means. The selector switches comprises several options. A first temperature selector switch 82A is capable of changing temperature in the Dr side air conditioning zone 11A stepwise to a temperature desired by a driver (first set point temperature) Tset1. A second temperature selector switch 82B is capable of changing temperature in the Pa side air conditioning zone 11B stepwise to a temperature desired by a passenger (second present temperature) Tset2. A blowing mode selector switch 83 is capable of switching the blowing mode among the face mode, bi-level mode, foot mode and foot/defrost mode. A blower airflow rate selector switch 84 is capable of changing stepwise a blower voltage applied to the blower motor 53 corresponding to an airflow rate from the blower 5 (blower airflow rate).

The liquid crystal display 81 has a first set point temperature display portion for displaying a first set point temperature (Tset1), a second set point temperature display portion for displaying a second set point temperature (Tset2), a current blowing mode display portion for displaying the blowing mode currently selected, and a blower airflow rate display portion for displaying the blower airflow rate currently selected.

The operation panel 8 further comprises an air inlet mode selector switch 85 capable of switching between an inside air circulation mode and an outside air inlet mode, a defrost mode selector switch 86 capable of selecting a defrost mode in which air is blown out only from the defrosting blowing opening 77 for enhancing the function of defrosting a windshield, an air-conditioner switch 87 capable of switching a refrigeration cycle on and off, namely switching the activation of the electromagnetic clutch of the compressor between on and off states, an automatic switch 88 for selecting an automatic control state where the control states of the above-mentioned air conditioning means are automatically controlled based on a predetermined control program (automatic control means), and an off switch 89 for inputting a stop order to stop the vehicle air conditioning device 1. Each of the air inlet mode selector switch 85, defrost mode selector switch 86, air-conditioner switch 87, and automatic switch 88 is provided with an indicator that is lit when a relevant control state or relevant mode is selected.

The CCD camera 9 is mounted in the vicinity of an inside rear view mirror (not shown) so that every seat in the passenger compartment is included within the field of view. The CCD camera 9 is a well-known identifying means and is capable of identifying a passenger based on an image taken thereby. The CCD camera 9 is also capable of identifying a seat position that the passenger thus identified has taken based on the passenger's seat position in the image taken by the CCD camera 9.

Figure 4:
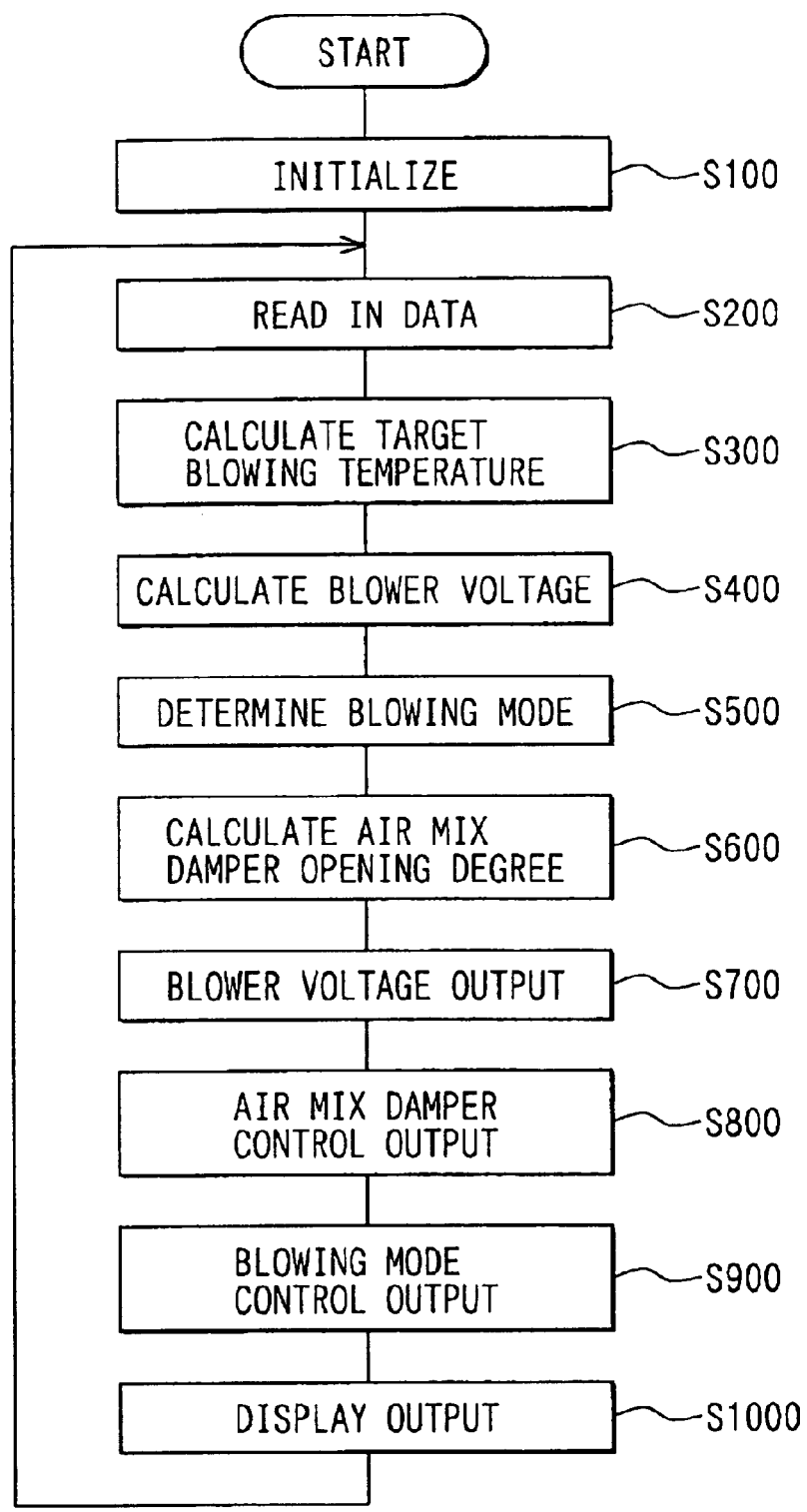
FIG. 4 is a flow chart of a basic control program.
Figure 5:
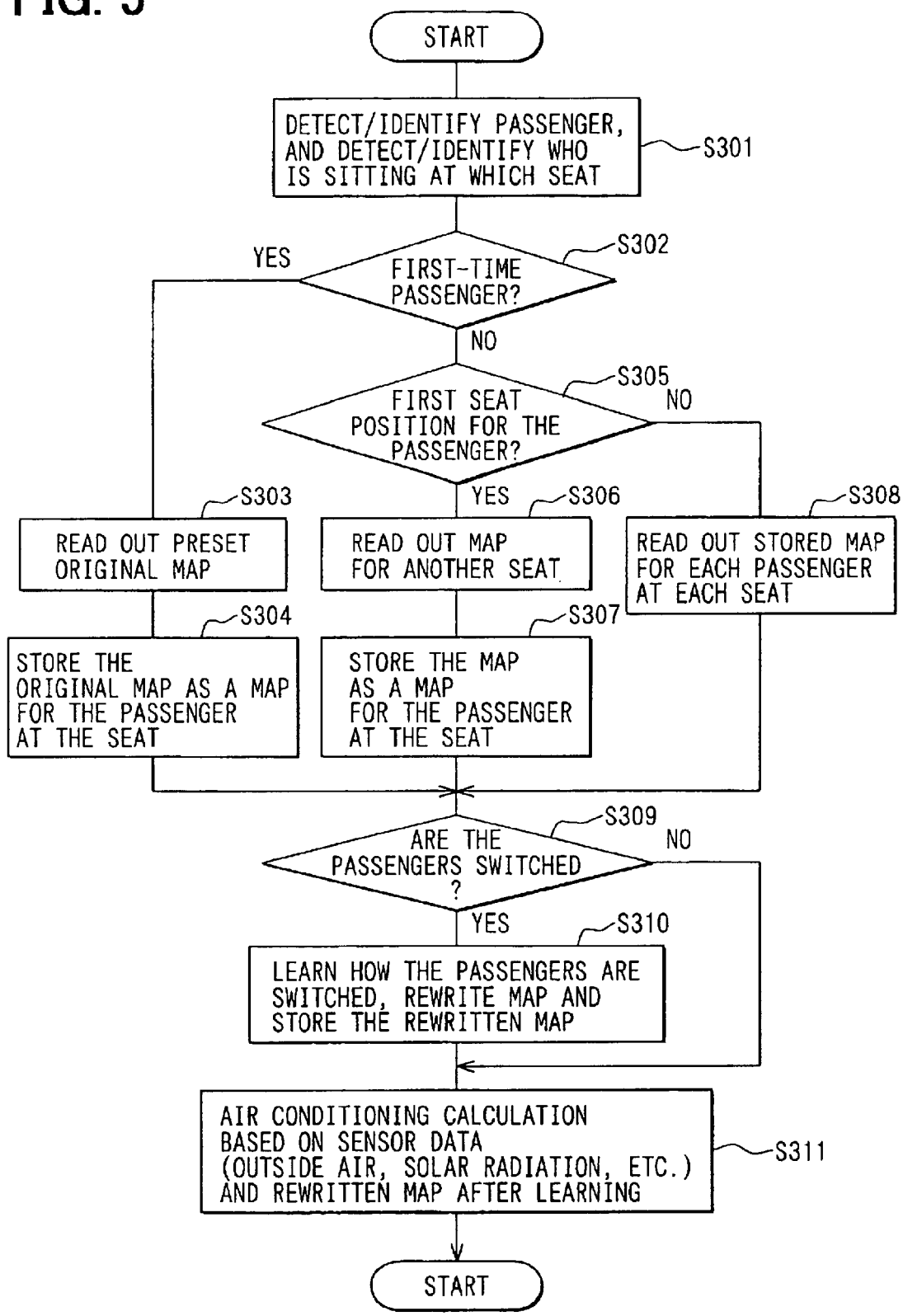
FIG. 5 is a subroutine flow chart showing processes of learning control characteristics for each passenger at each seat position.

The ECU 3 further comprises a central processing unit (CPU) 36, a ROM 37, a stand-by RAM 38 and so on, which are well known in the art. The CPU 36 serves as an automatic control means, a passenger identifying means, and a characteristic changing means, and processes inputted signals or the like based on a control program stored in the ROM 37. The ROM 37 is a non-volatile memory, which will not lose memory contents even when an ignition switch (not shown) is off, and stores and holds computing equations for a target blowing temperature and target opening degrees of the first and second air mix dampers 62A and 62B to be described later. The ROM 37 also holds an air inlet mode selection control map, a blowing mode selection control map, a compressor control map, a blower voltage control map, control programs as shown in FIGS. 4 and 5, and so on.

The stand-by RAM 38 serves as a storage means of the present invention that stores (backs up) control characteristics (e.g. temperature setting map in the present embodiment, described later) acquired by learning preferences of passengers at the corresponding seat positions, even when the ignition switch is off. The stand-by RAM 38 is supplied with power directly from a battery (not shown) without involving the ignition switch. Further, a back-up power supply (not shown) is provided to ensure power supply to the ECU 3 for a short period of time even when the battery is disconnected from the vehicle.

(Control Method of First Embodiment)

Control method according to the first embodiment of the present invention will be described with reference to FIGS. 4 through 8. When the ignition switch is turned on and the automatic switch 88 is also turned on, the ECU 3 is supplied with power to start the control program as shown in FIGS. 4 and 5.

In step 100, a part of information stored in the stand-by RAM 38 is initialized. For example, information that has been stored about who sat on which seat is cleared. In step 200, the stand-by RAM 38 is activated to store set points or set modes selected by the first temperature selector switch 82A, second temperature selector switch 82B, blowing mode selector switch 83, blower airflow rate selector switch 84, air inlet mode selector switch 85, defrost mode selector switch 86, air-conditioner switch 87 and automatic switch 88 of the operation panel 8, an inside air temperature Tr detected by the inside air temperature sensor 31, an outside air temperature Tam detected by the outside air temperature 32, an intensity of solar radiation Ts detected by the solar sensor 33, a post-evaporation temperature Te detected by the post-evaporation temperature sensor 34, and a cooling water temperature Tw detection by the water temperature sensor 35.

Then in step 300, a target blowing temperature for the Dr side air conditioning zone 11A (first target blowing temperature) TAO1 and a target blowing temperature for the Pa side air conditioning zone 11B (second target blowing temperature) TAO2 are calculated according to a control characteristics learning/calculating subroutine as shown in FIG. 5. A target blowing temperature calculating subroutine is a control program with learning function that identifies a passenger at each seat position, and calculates a target blowing temperature based on control characteristics (temperature setting map according to the present embodiment) for the passenger at the seat position (hereinafter, called "seat").

Figure 6:
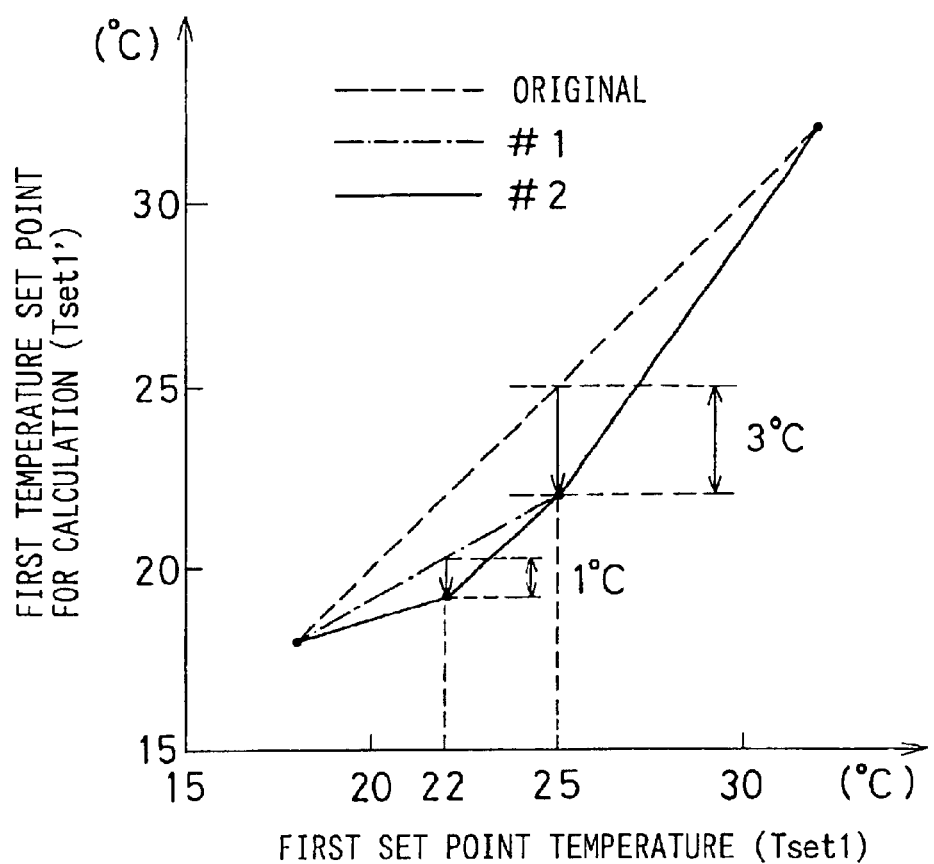
FIG. 6 is a temperature setting map showing relationship between set point temperatures and temperature set points for calculation.

Here, the temperature setting map is a map, as shown in FIG. 6, for determining a first temperature set point for calculation (Tset1') and second temperature set point for calculation (Tset2') to be used in calculation of the first target blowing temperature (TAO1) and second target blowing temperature (TAO2) from the first set point temperature (Tset 1) and the second set point temperature (Tset2), and is prepared for each passenger and for each seat position.

First, in step 301, information on a passenger and the passenger's seat position detected by the CCD camera 9 is read into the stand-by RAM 38. Second, in step 302, it is determined if the detected passenger is a first-time passenger for all the vehicle seats including the Dr and Pa side seats. If it is determined that the passenger is a first-time passenger for both the Dr side and Pa side seats, then in step 303, a previously set original map, as shown in the broken line in FIG. 6, is read out from the ROM 307, and in step 304, the original map is stored in the stand-by RAM 38 as a temperature setting map for that passenger in that seat.

If the passenger is not a first-time passenger for all the vehicle seats including the Dr and Pa side seats, then in step 305, it is determined if the detected seat position where the passenger has sit is a first-time position for the passenger. If it is determined to be a first-time position, then in step 306, a temperature setting map prepared based on the learning for another seat and stored in the stand-by RAM 38 is readout, and in step 307, it is stored in the stand-by RAM 38 as a temperature setting map for that passenger at that seat. For example, if a passenger X detected by the CCD camera 9 is not a first-time passenger for all the vehicle seats but is a first-time passenger for the Pa side seat, a temperature setting map prepared based on the learning for the passenger X at the Dr side seat is read out and stored as a temperature setting map for the passenger X at the Pa side seat.

In contrast, if the seat is not a first-time position, that is, the passenger has sit in the seat in the past, then in step 308, a temperature setting map prepared based on the learning for the seat and stored in the stand-by RAM 38 is read out. Subsequently instep 309, it is confirmed if the passenger has performed a manual setting on the operation panel 8, in other words, if the passenger has manipulated a selector switch (according to the present embodiment, if the passenger has manipulated the first temperature selector switch 82A or the second temperature selector switch 82B).

If it is found that the first temperature selector switch 82A or second temperature selector switch 82B has been manipulated to change the first set point temperature (Tset1) or second set point temperature (Tset2), then in step 310, the first set point temperature (Tset1) or second set point temperature (Tset2) that has been changed is learnt to rewrite the temperature setting map, and the rewritten map is stored in the stand-by RAM 38. For example, when a passenger Y who is a first-time passenger for all the vehicle seats, including the Dr and Pa side seats, has sit in the Dr side seat and has changed the first set point temperature (Tset1) for the first time (e.g. from 25° C. to 22° C.), the original map read out from the ROM 37 in step 303 is rewritten as a temperature setting map #1 shown by the dash-dot line in FIG. 6. If the passenger Y further changes the first set point temperature (Tset1) (e.g. from 22° C. to 21° C.) at the Dr side seat, the temperature setting map #1 read out from the stand-by RAM 38 in step 308 is rewritten as a temperature setting map #2 shown by the solid line in FIG. 6.

In step 311, a first temperature set point for calculation (Tset1') and second temperature set point for calculation (Tset2') are obtained based on the first set point temperature (Tset1) and second set point temperature (Tset2) by using there written temperature setting map. Then, based on these, first temperature set point for calculation (Tset1') and second temperature set point for calculation (Tset2'), a first target blowing temperature (TAO1) and second target blowing temperature (TAO2) are calculated by using the following equations (1) and (2):

$$TAO1 = Kset \times Tset1' - Kr \times Tr - Kam \times Tam - Ks \times Ts + C \quad (1)$$

$$TAO2 = Kset \times Tset2' - Kr \times Tr - Kam \times Tam - Ks \times Ts + C \quad (2)$$

In these equations, Kset, Kr, Kam and Ks are coefficients called a temperature set gain, an inside air temperature gain, an outside air temperature gain, and a solar gain, respectively, and C is a correction constant. Tr, Tam, and Ts are an inside temperature, outside air temperature and solar irradiance, respectively, that have been read in step 200 of the basic program.

Figure 7A:
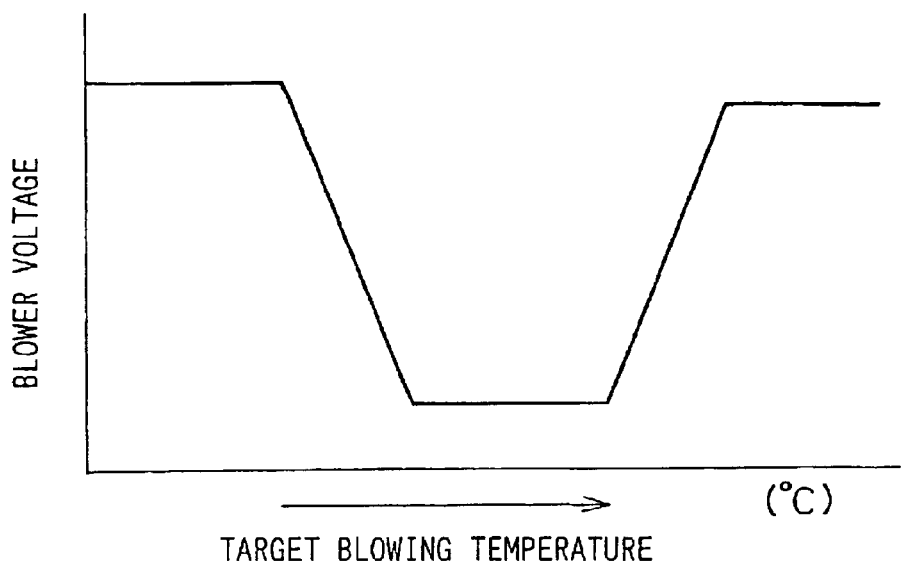
FIG. 7A is a blower voltage control map showing relationships between target blowing temperatures and blower voltages.

Upon completion of step 311, the routine returns to step 400 of the basic program. In step 400, a blower voltage is calculated based on the first target blowing temperature (TAO1) and the second target blowing temperature (TAO2) obtained by the subroutine program. Specifically, a first blower voltage (V1) and a second blower voltage (V2) corresponding, respectively, to the first and second blowing temperatures, are determined from a blower voltage control map as shown in FIG. 7A, and a blower voltage (V) is determined by averaging these voltages (V1) and (V2).

Figure 8:
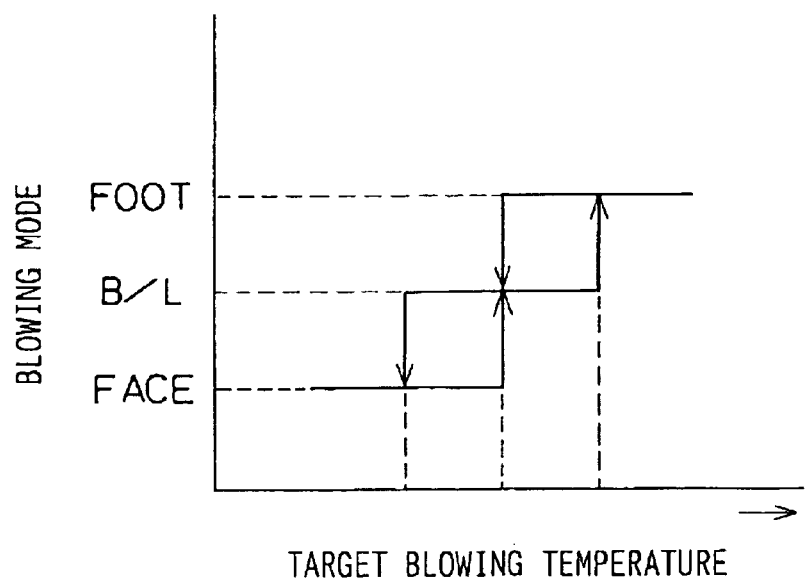
FIG. 8 is a blowing mode selection control map showing relationships between target blowing temperatures and blowing modes.

Next, in step 500, blowing openings through which air is blown respectively into the Dr side air conditioning zone 11 and the Pa side air conditioning zone 11B are determined. Specifically, respective blowing modes are determined for the Dr side air conditioning zone 11A and Pa side air conditioning zone 11B based on the first target blowing temperature (TAO1) and second target blowing temperature (TAO2) according to a blowing mode selection control map as shown in FIG. 8.

Then, in step 600, respective target opening degrees (first and second target opening degrees) are calculated for the first air mix damper 62A and second air mix damper 62B based on the first target blowing temperature (TAO1) and second target blowing temperature (TAO2). The first target opening degree (SW1) and second target opening degree (SW2) are determined based on the first target blowing temperature (TAO1) and second target blowing temperature (TAO2) by using the following equations (3) and (4):

$$SW1 = (TAO1 - Te) \times 100/(Tw - Te) \quad (3)$$

$$SW2 = (TAO2 - Te) \times 100/(Tw - Te) \quad (4)$$

Subsequently, in step 700, an output signal is sent to the blower driving circuit 54 to provide the determined blower voltage (V). In step 800, an output signal is sent to the actuators 63A and 63B to provide the determined first target opening degree (SW1) and second target opening degree (SW2), respectively. In step 900, an output signal is sent to the actuators 78A, 78B, and 79 to establish the determined blowing modes. Finally, in step 1000, an output signal is sent to the liquid crystal display 81, and then the routine returns to step 200.

The control state of the inside/outside air switch-over damper 43 when the automatic switch 88 is turned on (when the automatic control is selected) is determined based on the first target blowing temperature (TAO1) and second target blowing temperature (TAO2) by using an air inlet mode selection control map (not shown), and an output signal is sent to the inside/outside air switching actuator 44. Further, the control state of the compressor (connection or disconnection of the compressor to the electromagnetic clutch) is determined based on the post-evaporation temperature (Te) by using a compressor control map (now shown) and an output signal is sent to the electromagnetic clutch.

(Advantages of First Embodiment)

As described above, according to the configuration of the vehicle air conditioning system 1 that is capable of controlling temperature independently for the left and right sides in a vehicle, in order to obtain the temperature set points for calculation, required for calculating target blowing temperatures for determining the opening degrees of the first and second air mix dampers 62A and 62B, the temperature setting maps reflecting preferences of passengers for the Dr and Pa sides are stored. If a set point temperature is changed manually, the vehicle air conditioning system 1 is capable of learning this change, rewriting and restoring the relevant temperature setting map, and thus capable of storing temperature setting maps reflecting preferences of each passenger for the Dr and Pa sides, separately. In this manner, the opening degrees of the first and second air mix dampers 62A, 62B can be adjusted to control temperature separately for the Dr and Pa sides in accordance with a preference of each passenger.

(Configuration of Second Embodiment)

Figure 9:
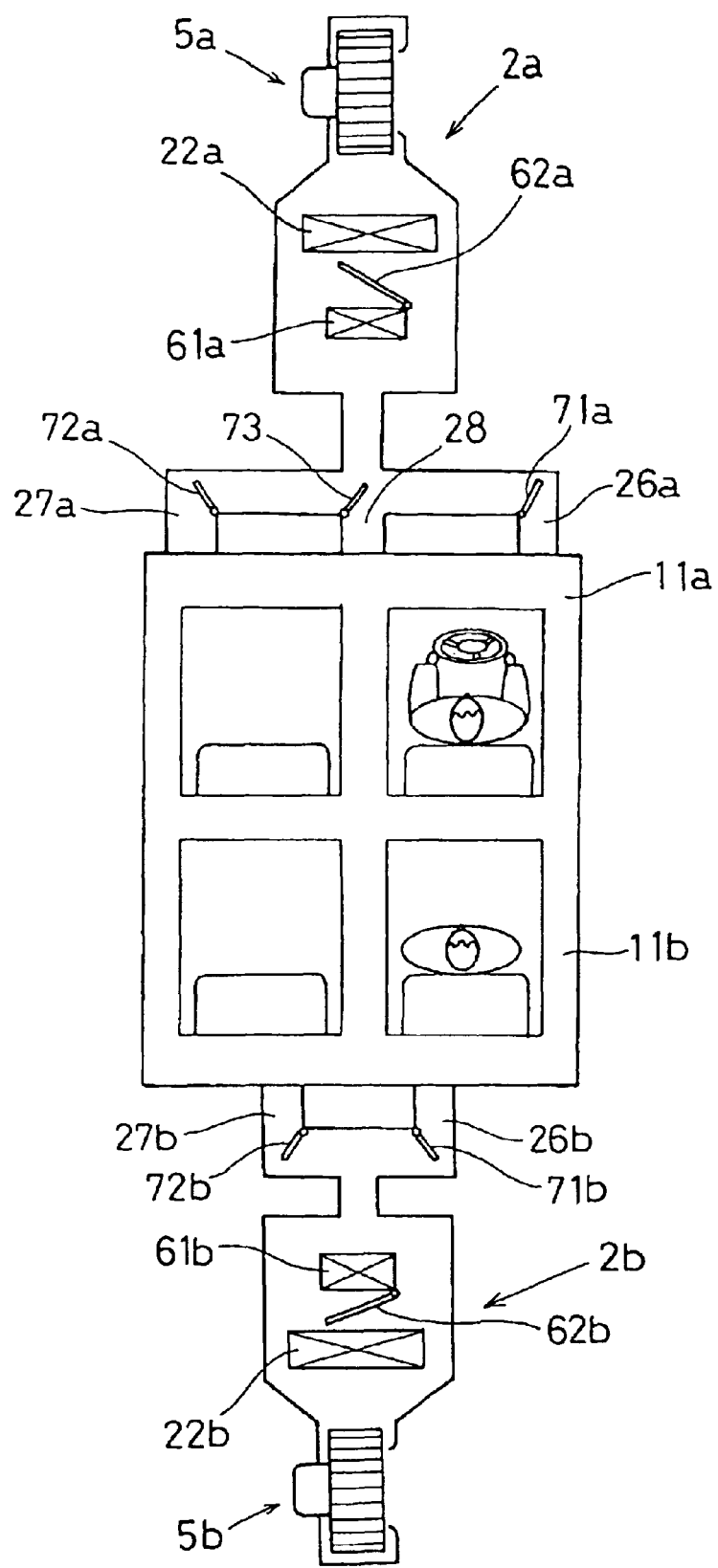
FIG. 9 is a diagram of a vehicle air conditioning system according to a second embodiment of the present invention and seat positions in a passenger compartment.

A vehicle air conditioning system according to a second embodiment of the present invention is shown in FIG. 9. This second embodiment has a front air conditioning unit 2a for air conditioning the front seat area of a passenger compartment (called the "front side") and a rear air conditioning unit 2b for air conditioning the rear seat area of the passenger compartment (called the "rear side").

The front and rear air conditioning units 2a, 2b of the present embodiment are capable of controlling, independently from each other, not only temperature but also blower airflow rates for the front side air conditioning zone 11a and rear side air conditioning zone 11b, respectively. The ECU 3 is capable of identifying a passenger and the passenger's seat position, learning the blower airflow rate set state of the passenger at the seat position (either front side or rear side) and automatically controlling the blower voltage based on the learning to achieve a target blowing temperature.

The front air conditioning unit 2a is disposed at the frontmost position in the passenger compartment and has a similar configuration to that of the first embodiment. The front air conditioning unit 2a has an air blower 5a, an evaporator 22a, a heater core 61a, an air mix damper 62a, a front face blowing air passageway 26a, a front foot blowing air passageway 27a, a defroster air passageway 28, a front face-mode damper 71a, a front foot-mode damper 72a, a defroster damper 73, and so on.

The rear air conditioning unit 2b is disposed at the rearmost position in the passenger compartment, and has a similar configuration as that of the first embodiment. The rear air conditioning unit 2b has an air blower 5b, an evaporator 22b, a heater core 61b, an air mix damper 62b, a rear face blowing air passageway 26b, a rear foot blowing air passageway 27b, a rear face-mode damper 71b, a rear foot-mode damper 72b, and so on.

(Control Method of Second Embodiment)

According to a control method of the second embodiment, since the blowers 5a, 5b are provided separately and independently in the front and rear of the passenger compartment, a blower voltage can be set separately for each passenger in the front or rear seat. The Learning function of the blower voltage will be described below.

Figure 7B:
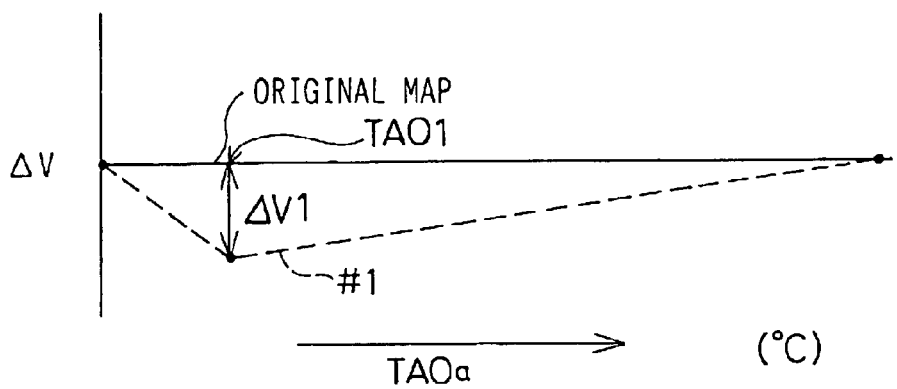
FIG. 7B is a blower voltage correction map showing relationships between target blowing temperatures and blower voltages.
Figure 7C:
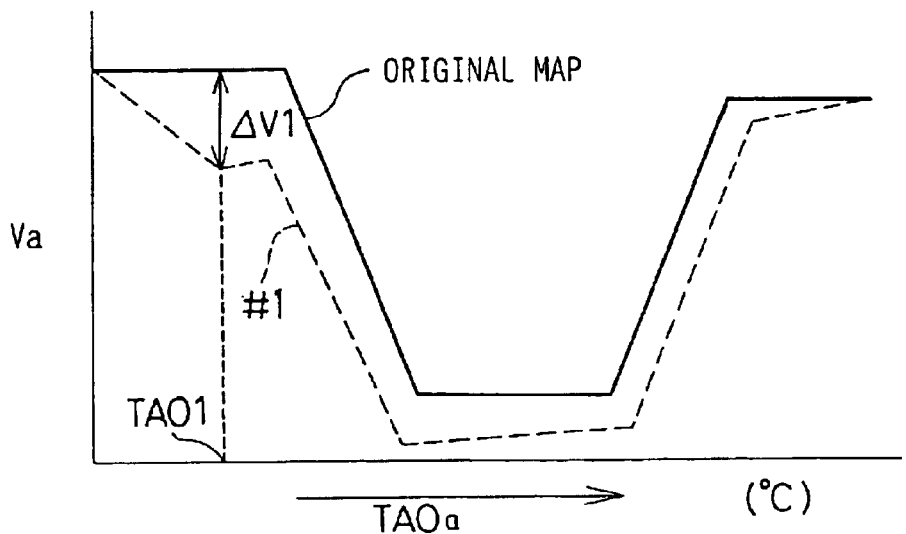
FIG. 7C is a blower voltage control map showing relationship between target blowing temperatures and blower voltages.

If a front seat passenger detected by the CCD camera 9 is a first-time passenger Z for either front and rear seats, an original map preset as shown by the solid line in FIG. 7C is read out from the ROM 37 as a blower voltage setting map. In the case when a blower airflow rate is then changed for the first time under the conditions where a target blowing temperature TAOa for the front air conditioning zone 11a is T1 and a variation in the blower voltage Va of the front air conditioning unit 2a is ΔV1, a blower voltage correction map representing the correlation between blower voltage corrections ΔV and front target blowing temperatures TAO1 will be rewritten as shown in FIG. 7B.

In other words, the original map originally was a straight line connecting a point I representing the upper limit of the target blowing temperature at ΔV=±0 and a point II representing the lower limit. After the first change, the original map becomes as shown by a dashed line #1 connecting the point II and a point III (TAOa=T1, ΔV=ΔV1). Accordingly, the blower voltage control map is also changed as the dashed line #1 in FIG. 7C. Upon a second change of the blower airflow rate, the blower voltage correction map is rewritten in a similar manner based on the line #1, and further the blower voltage control map #1 is rewritten based on the blower voltage correction map thus rewritten. Similar rewriting is repeated after a third change of the blower airflow rate and onwards.

It should be noted that rewritings of the blower voltage correction map and blower voltage control map are performed in a similar manner with respect to a target blowing temperature for the rear air conditioning zone 11b (rear target blowing temperature) TAOb and a blower voltage Vb of the rear air conditioning unit 2b.

(Advantages of Second Embodiment)

As described above, in the vehicle air conditioning device having the blowers 5a, 5b disposed separately and independently in the front and rear areas, a blower voltage to control a blower airflow rate is controlled by storing a blower voltage control map reflecting a preference of each passenger separately for the front and rear areas. When the blower airflow rate is changed by a manual setting, the relevant blower voltage control map is altered and restored by learning such change. In this manner, it is possible to store a blower voltage control map reflecting a preference of each passenger separately for the front and rear areas, and to control the blower airflow rate according to the preference of each passenger by controlling the blower voltages separately for the front and rear areas.

(Other Embodiments)

Figure 10:
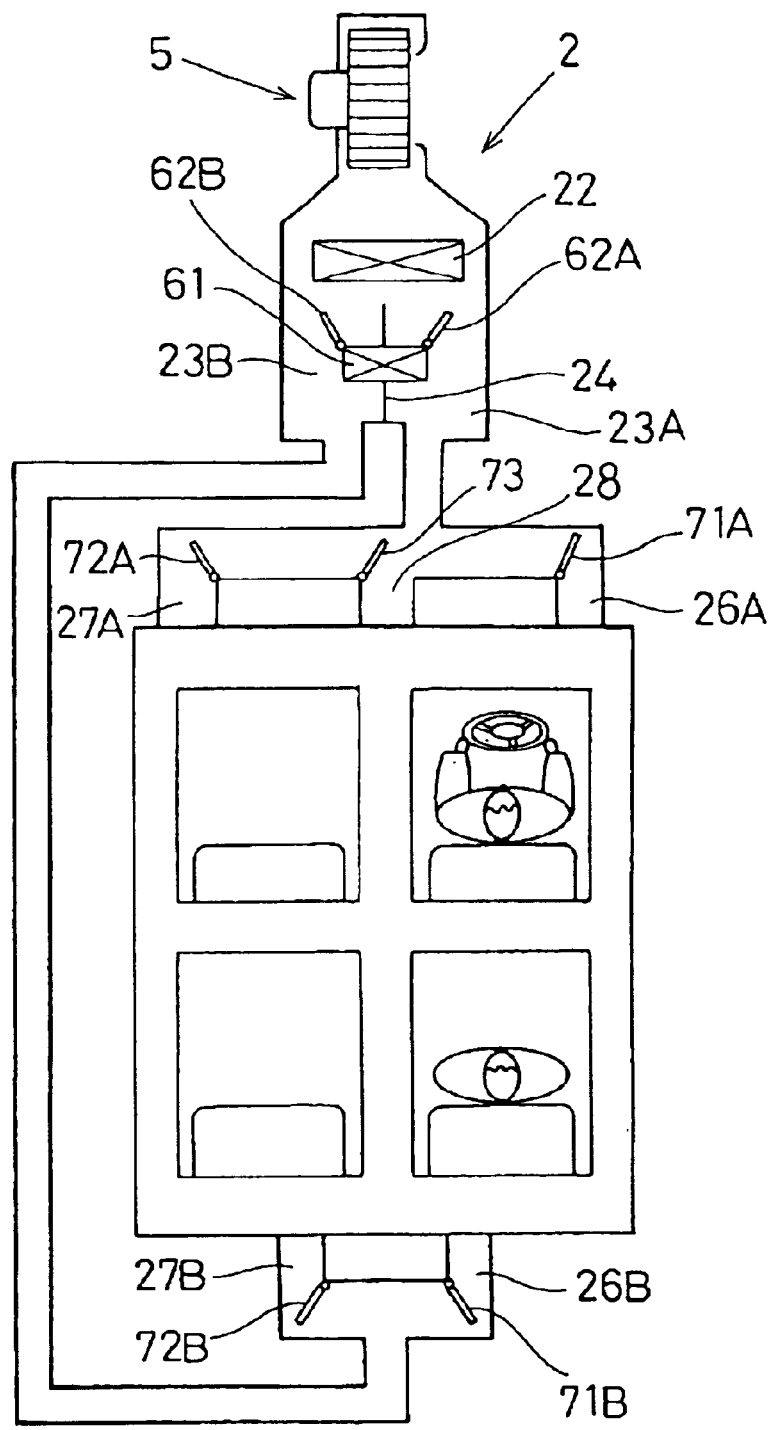
FIG. 10 is a diagram of a vehicle air conditioning system according to another embodiment of the present invention and seat positions in a passenger compartment.
Figure 11:
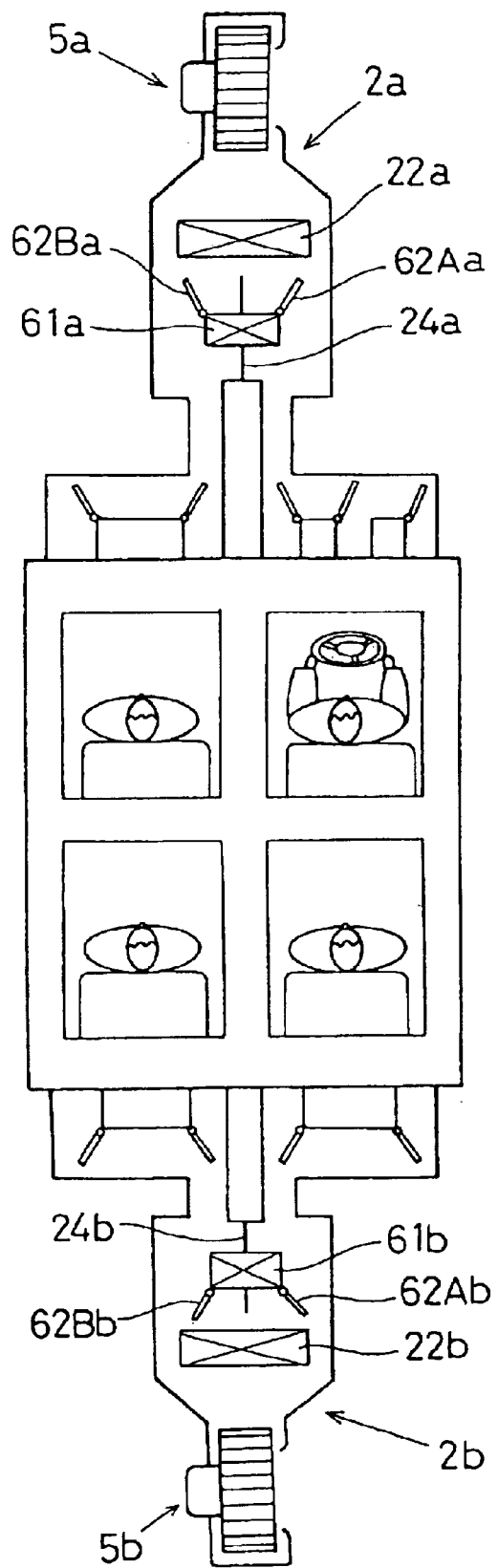
FIG. 11 is a diagram of a vehicle air conditioning system according to still another embodiment of the present invention and seat positions in a passenger compartment.

In the description above, the first embodiment was described as a vehicle air conditioning system that is independently controllable for the Dr and Pa sides. However, the present invention can be applied to a vehicle air conditioning system independently controllable for the front and rear areas by leading the second air passageway 23B to the rear of the compartment as shown in FIG. 10. Further, as shown in FIG. 11, air passageways of both the front air conditioning unit 2a and the rear air conditioning unit 2b are divided into two parts by providing partitions 24a, 24b in the heater cores 61a, 61b, respectively, and air mix dampers 62Aa, 62Ba are provided in the front Dr side and front Pa side, respectively, while air mix dampers 62Ab and 62Bb are provided in the rear Dr side and rear Pa side, respectively, so that temperatures can be controlled separately and independently for the respective four seats. In this case, a temperature setting map is prepared for each passenger at each of the four seats so that automatic control can be implemented through learning and storing.

Further, in the first and second embodiments, the temperature adjusting means 6 and the airflow rate adjusting means (blower 5) are employed as air conditioning means. However, any other means that can be controlled independently, including the air inlet mode switching means 4, cooling/dehumidifying means (evaporator 22), and blowing mode switching means 7, can be used for implementing automatic control reflecting preferences of each passenger at each seat position.

In the present embodiments, the CCD camera 9 is employed as a passenger identifying means. However, passengers also can be identified by using a personal key, a mobile phone, PDA, or other terminal devices that can be carried by the passengers individually. Further, passengers also can be identified according to their personal data such as seat positions, body weights, how their backs or buttocks contact seats, and fingerprints detected when they touch a vehicle door to open/close it. It is also possible to make these several means available and to allow passengers to select one for utilization. Furthermore, the stand-by RAM 38 is employed as a storing means. However, it is also possible to use a volatile memory such as an EEPROM, EPROM and flash memory, or other storage medium such as a DVD-ROM, CD-ROM, and flexible disk.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning system comprising:
    means for independently air conditioning a plurality of zones in a passenger compartment;
    means for storing control characteristics of the air conditioning means for at least one passenger;
    means for automatically controlling a control state of the air conditioning means based on the control characteristics of the air conditioning means for each passenger stored by the storing means;
    means for manually setting the control state of the air conditioning means for each passenger;
    means for identifying a specific passenger; and
    means for learning a set state of the manual setting means, and altering the control characteristics of the air conditioning means for each passenger stored in the storing means based on the results of learning and storing the altered control characteristic; wherein
    the passenger identifying means is capable of identifying a seat position taken by the specific passenger,
    the storing means is capable of storing control characteristics of the air conditioning means for each seat position taken by the specific passenger, and
    the characteristics altering means is capable of altering control characteristics of the air conditioning means for each seat position taken by the specific passenger and causing the altered control characteristics to be stored.

2. The vehicle air conditioning system according to claim 1, wherein
    the identifying means is a personal key.

3. The vehicle air conditioning system according to claim 1, wherein
    the identifying means is a personal data.

4. The vehicle air conditioning system according to claim 1, wherein
    the identifying means is a mobile phone.

5. The vehicle air conditioning system according to claim 1, wherein
    the air conditioning means is an inside/outside air switching means for switching between an outside air inlet mode for introducing outside air and an inside air circulation mode for circulating inside air.

6. The vehicle air conditioning system according to claim 1, wherein
    the air conditioning means is an airflow rate adjusting means for adjusting a rate of airflow into a duct.

7. The vehicle air conditioning system according to claim 1, wherein
    the air conditioning means is a cooling/dehumidifying means for cooling and dehumidifying any one of outside air and inside air introduced into a duct.

8. The vehicle air conditioning system according to claim 1, wherein
    the air conditioning means is a temperature adjusting means for adjusting a temperature by heating any one of outside air and inside air introduced into the duct.

9. The vehicle air conditioning system according to claim 1, wherein
    the air conditioning means is a blowing mode switching means for selecting a blowing mode of any one of outside air and inside air introduced into the duct.

10. The vehicle air conditioning system according to claim 1, wherein said identifying means further comprises:
    means for detecting and identifying the specific passenger detected by a camera and storing information on who is sitting at which seat; and
    said characteristics altering means further comprises:
    means for determining whether or not a detected passenger is a first-time passenger for both a driver seat and a front passenger seat;
    means for reading out a preset original map if the passenger is determined to be a first-time passenger;
    means for determining, if it is determined that the passenger is not a first-time passenger, whether or not the seat taken by the passenger is a seat where the passenger has taken for the first time;
    means for reading out, if it is determined that the passenger has taken the seat for the first time, a prestored temperature setting map based on the results of learning for another seat;
    means for reading out, if it is determined that it is not for the first time that the passenger has taken the seat, a prestored temperature setting map based on the results of learning for the seat;
    means for learning in response to passengers changing seats and rewriting said read out map based on the result of learning; and
    means for calculating target blowing temperatures for the driver seat and the front passenger seat, respectively, by using the rewritten map and adjusting the temperatures at the driver seat and the front passenger seat, respectively, based on the calculated target blowing temperature.

11. The vehicle air conditioning system according to claim 10, wherein said means for learning in response to passengers changing seats further comprises:
    means for confirming which of a first set point temperature for the driver seat and a second set point temperature for the front passenger seat has been changed manually by the passenger on an operation panel; and
    means for learning the change of the first or second set point temperature, whichever has been changed, to rewrite the read out map; and said means for adjusting temperature further comprises:
means for determining a first set point temperature for calculation and a second set point temperature for calculation from said first set point temperature or second set point temperature by using the rewritten map, calculating a first target blowing temperature for the driver seat and a second target blowing temperature for the front passenger seat based on the first and second set point temperatures for calculation thus determined, and adjusting temperatures of air conditioning air blown out towards the driver seat and the front passenger seat based on the respective target blowing temperatures thus calculated.

12. A vehicle air conditioning system control method comprising:
providing air conditioning zones in a passenger compartment;
identifying passengers in the air conditioning zones;
storing air conditioning control characteristics of passengers seated in the passenger compartment zones;
automatically controlling the air conditioning system based on the stored control characteristics of each passenger;
manually setting control characteristics by at least one passenger;
learning the manual settings of each passenger; and
altering air conditioning control according to the control characteristics learned and stored for each passenger; wherein
identifying passengers in the air conditioning zones further comprises identifying a seat position taken by the identified passenger,
storing air conditioning control characteristics of passengers seated in the passenger compartment zones further comprises storing control characteristics of the air conditioning for each seat position taken by the identified passenger, and
altering air conditioning control according to the control characteristics learned and stored for each passenger further comprises altering air conditioning control according to control characteristics for each seat position taken by the identified passenger and causing the altered control characteristics to be stored.

13. A vehicle air conditioning system comprising:
means for independently air conditioning a plurality of zones in a passenger compartment, each of the plurality of zones being associated with a respective seat position;
means for storing control characteristics of the air conditioning means for at least one passenger;
means for automatically controlling a control state of the air conditioning means based on the control characteristics of the air conditioning means for each passenger stored by the storing means;
means for manually setting the control state of the air conditioning means for each passenger;
means for identifying a specific passenger and a specific seat position taken by the specific passenger; and
means for learning a set state of the manual setting means, and altering the control characteristics of the air conditioning means for each passenger stored in the storing means based on the results of learning and storing the altered control characteristics.

* * * * *